May 13, 1930.                    R. J. LUSSE                    1,758,799
                              AMUSEMENT VEHICLE
                   Filed Sept. 27, 1926         4 Sheets-Sheet 3

Inventor:-
Robert J. Lusse.
by his Attorneys,
Howson & Howson

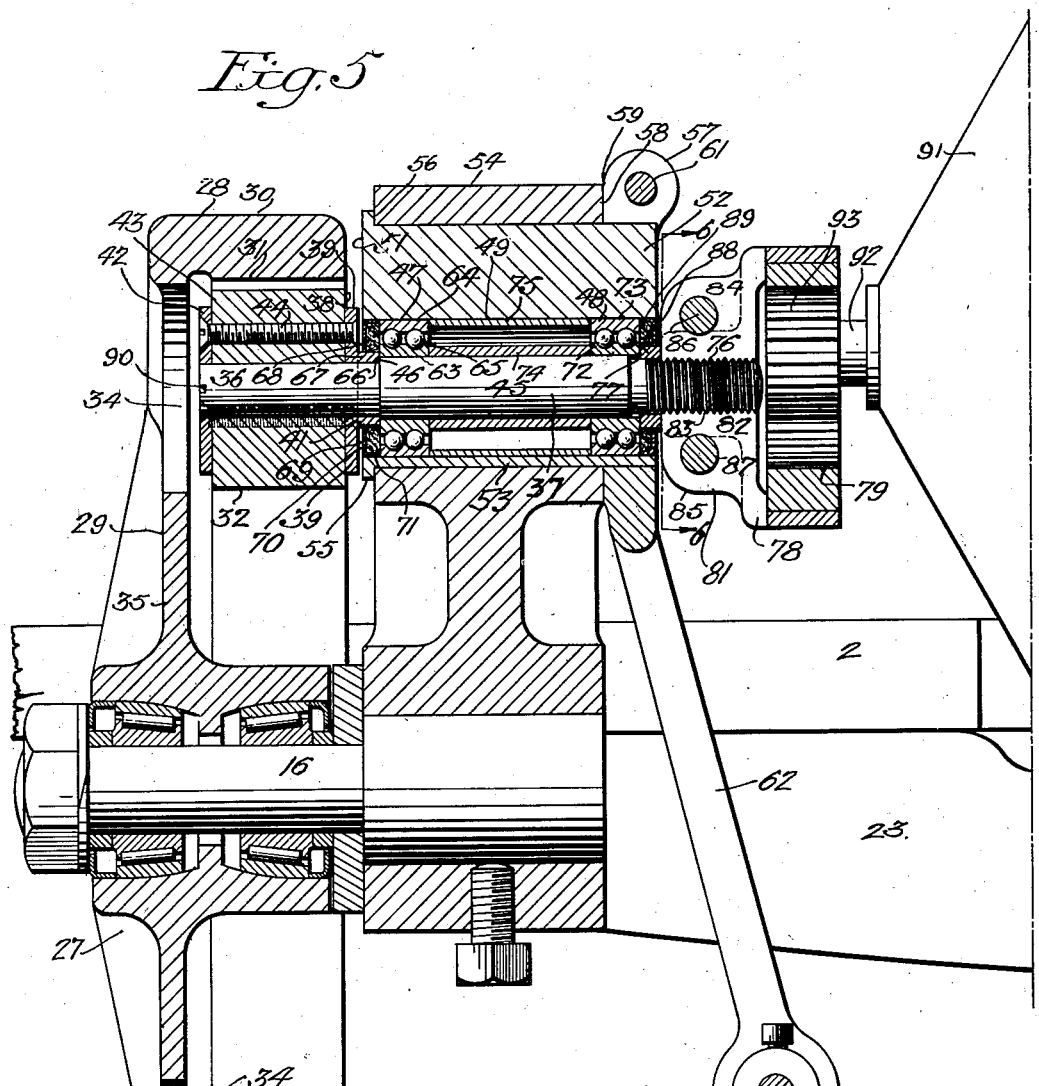

Patented May 13, 1930

1,758,799

UNITED STATES PATENT OFFICE

ROBERT J. LUSSE, OF PHILADELPHIA, PENNSYLVANIA

AMUSEMENT VEHICLE

Application filed September 27, 1926. Serial No. 138,004.

My invention relates to motor vehicles, having particular relation to such vehicles as are applicable to amusement parks and the like.

A broad feature of my invention is the provision of a car of the above type that shall be characterized by its simplicity of design, rigidity of construction and absence of undesirable operating noises.

A more specific object of my invention is to provide a mounting for the frictional driving element of a car wheel that shall facilitate the removal and replacement of said frictional element when worn and that shall require a minimum disturbance of adjacent connected parts.

Another object of my invention is to provide a structure comprising a car wheel having an aperture, a driving element for said car wheel disposed on one side thereof, a movable bearing, a driving shaft for said element removably mounted in said bearing eccentrically of the axis thereof, a driving motor, and a coupling member for interconnecting said shaft and said motor for all working positions of said driving element, the coupling member being detachably secured to said shaft to permit the removal of said driving element and said shaft through said aperture when replacement of these parts is required.

With these and other objects and applications in mind, my invention further consists in the details of construction and operation and arrangement, hereinafter described and claimed and illustrated in the accompanying drawings, wherein Fig. 1 is a longitudinal sectional view of a car embodying my invention;

Fig. 3 is a view similar to Fig. 2, showing the effect of actuating the swinging post section rearwardly with the steering wheel in the mid-position;

Fig. 4 is a similar view, illustrating the disconnection of one of the frictional driving elements from its cooperating car wheel upon the turning of the steering wheel from the position of Fig. 3;

Fig. 5 is an enlarged detail transverse sectional view taken on the line 5—5 of Fig. 1, showing my improved mounting for the frictional driving element; and Fig. 6 is a transverse sectional view taken on the line 6—6 of Fig. 5.

Figure 1:
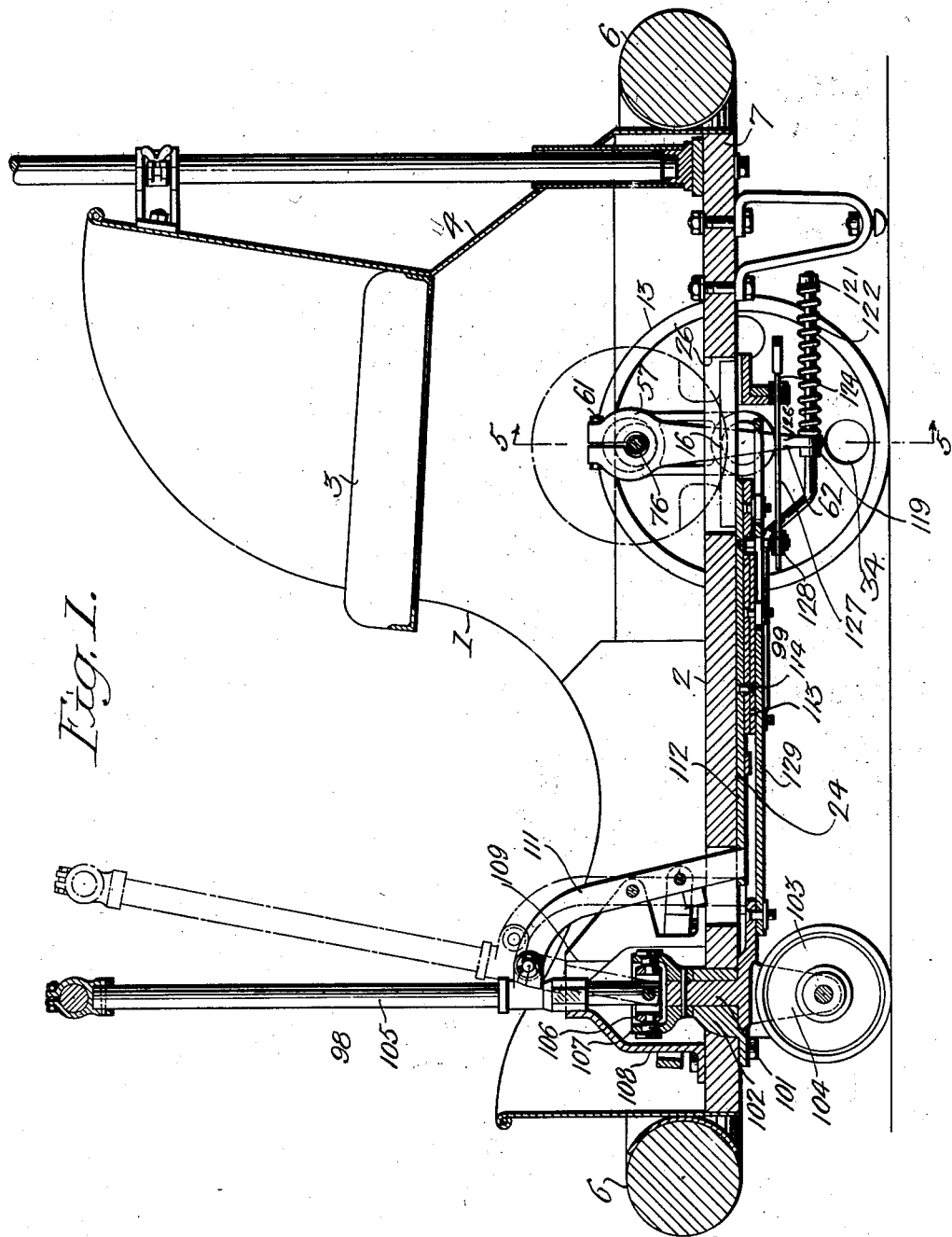

In the embodiment of my invention shown in the drawing, a car body 1 comprises a platform 2, a seat 3, a supporting structure 4 for said seat, which extends upwardly from an outer edge 5 of the platform 2, and a suitable shock resisting bumper 6 which encircles the base portion 7 of the structure 4 and is secured thereto in any desired manner. Opposite sides 8 and 9 of the platform 2 are provided with openings 11 and 12 through which wheels 13 and 14 respectively extend from a metallic floor surface 15. The wheels 13 and 14 are respectively provided with axles 16 and 17 supported in bearings 18 and 19 formed on opposite ends 21 and 22 of a bracket member 23. The member 23 extends transversely of the car platform 2 and is secured to an underside 24 of the platform 2 by bolts 25 in order to close partially a similarly extending recess 26 in the platform 2.

As particularly illustrated in Fig. 5, the car wheel 13 comprises a central hub portion 27, an outer rim 28, and an interconnecting web portion 29. An outer side 30 of the rim 28 is adapted to engage the metallic floor surface 15, while an inner side 31 is adapted to co-act with a frictional driving element 32. The element 32 is positioned adjacent to an inner side 33 of the web portion 29. The web portion 29 is provided with a plurality of apertures 34, affording access to the frictional element 32 from an outer side 35. The openings 34, of which four are shown, are preferably of such dimensions that the frictional driving element 32 may be removed therethrough, all as will appear hereinafter in greater detail.

The frictional element 32 is preferably of annular form and it may be mounted on an outer end portion 36 of a driving shaft 37.

An inner side 38 of the frictional driving element 32 abuts against a flange 39 of a member 41 which is shrunk or otherwise rigidly secured on the outer end portion 36. A ring 42 is mounted on the shaft end portion 36 adjacent to an outer side 43 of the driving element 32. These parts may be rigidly secured in position by a plurality of screws 44, each of which extend through aligned apertures in the ring 42, the driving element 32 and the flange 39. The foregoing construction not only provides a rigid mounting for the driving element 32 but it also permits a quick removal thereof from the shaft end portion 36 for purposes of repair and the like.

An intermediate portion 45 of the driving shaft 37 is of enlarged diameter with respect to that of the shaft end portion 36, forming a shoulder 46, and it is supported on spaced anti-friction devices 47 and 48 positioned inwardly of the ends of a passage 49 that extends between outer and inner sides 51 and 52, respectively, of a bearing member 53. The bearing member 53 is rotatably supported in a standard 54 extending vertically upwardly from the bracket member 23. An axial movement of the bearing member 53 in one direction is prevented by an annular shoulder 55 which engages an outer bearing surface 56 of the vertical standard 54. Movement of the bearing member 53 in the opposite direction is prevented except when it is desired to replace the same by means of an annular member 57, one side 58 of which engages an inner bearing surface 59 of the standard 54. The member 57 may comprise two arms, which are connected by means of a clamping screw 61, and it is extended to provide an operating arm 62, the movement of which causes a turning of the bearing member 53. The turning of the bearing member 53 causes the actuation of the friction element 32 relative to the rim 28 due to the positioning of the shaft passage 49 eccentrically of the axis of the bearing member 53.

The anti-friction device 47 comprises concentric rings 63 and 64, which respectively engage the enlarged shaft portion 45 and the wall of the passage 49, and a plurality of interposed anti-friction elements 65. The inner ring 63 is positioned adjacent to the shoulder 46, whereby an edge 66 of a cylindrical portion 67 of the member 41 may abut against said ring 63 and thereby limit the movement of the shaft 37 in one direction. The passage of grease from the anti-friction device 47 to the outer side 51 of the bearing member 53 may be prevented by packing 68 that is retained in place by means of a cap 69 comprising a flat portion 70 which encircles the cylindrical portion 67 of the member 41 and is positioned in alignment with the adjacent side 51 of the bearing member 53. The cap 69 is also provided with a flange portion 71 which engages the inner side of the shaft passage 49 and abuts against the outer bearing ring 64. The anti-friction device 48 is similar to the device 47, comprising inner and outer rings 72 and 73. The inner rings 63 and 72 may be maintained in desired spaced relation by a spacing tube 74 closely fitting the intermediate shaft portion 45. The outer rings 64 and 73 may be similar spaced by a tube 75 engaging the wall of the passage 49.

An inner end portion 76 of the shaft 37 is also of reduced diameter, as in the case of the outer end portion 36, and it is so formed that the inner ring 72 extends over the same to form a shoulder 77. The portion 76 is threaded for the removable reception of a two-part coupling member 78, an inner section of which is provided with a recess formed to constitute an internal gear-wheel 79. An outer section 81 comprises a cylindrical portion 82 having a threaded opening 83 for the reception of the threaded shaft portion 76. The section 81 also comprises oppositely extending pairs of ears 84 and 85, which are interconnected by clamping bolts 86 and 87, respectively, whereby the shaft 37 may be unscrewed from the coupling member 78 only when the bolts 86 and 87 are released. A washer 88 is interposed between the end portion 82 of the coupling member 78 and the inner ring 72 of the anti-friction device 48. The passage of grease from the anti-friction device 48 to the inner side 52 of the movable bearing member 53 may be prevented by means 89 which includes packing and a cap corresponding to that at the opposite end of the shaft passage 49.

The coupling member 78 thus serves as a nut for the shaft 37, permitting the locking of the shaft 37 in the passage 49 but also the quick removal of the shaft 37 from said passage. For example, should the friction element 32 require replacement, it is only necessary to loosen the bolts 86 and 87 and unscrew the shaft 37 from the coupling member 78. This may be facilitated by a tool slot 90, which is formed in the outer end of the supporting section 36 and is accessible through one of the apertures 34 in the car wheel 13. When the threaded end portion 76 is completely detached from the coupling member 78, the anti-friction element 32 and the shaft 37 may be completely removed from the adjacent supporting parts of the car without a further disturbance of the same, thus affording considerable saving in repair expenses and the general upkeep of the car.

In order that the shaft 37 may be positively actuated by a driving motor 91 for all desired operating positions of the frictional driving elements 32, I provide a driving shaft 92 of the motor 91 with a pinion 93 positioned in axial alignment with the bearing member 53 and also in mesh with the internal gear-wheel 79. Inasmuch as the bearing member 53 is in alignment with the driving pinion 93, a proper working relation is assured between these two gear-wheel elements for all working positions of the frictional driving element 32 relative to the car wheel 13. The car wheel 14 may be actuated by a frictional driving element 94, which is supported on a removable shaft 95 similar to the shaft 37 and similarly connected by a coupling member 96 to the driving shaft 92. The frictional driving element 94 may be actuated relative to the car wheel 14 by an arm 97 corresponding to the operating arm 62. A somewhat similar form of supporting means and connection constitute an important feature of my co-pending application, Serial No. 122,633, filed July 15, 1926.

Steering mechanism for the car comprises a rotary swinging post 98 which is mounted at the forward end of the car and associated by mechanism 99 with the lever arms 62 and 97, whereby the frictional driving elements 32 and 94 may be rendered effective and ineffective in accordance with the position of the steering means 98, as will presently appear in greater detail. The steering means 98 comprises a base section 101, which is mounted in a casting 102 for movement about a vertical axis. A steering wheel 103 is mounted in a bifurcated end portion 104 of the vertical base section 101. An upper section 105 of the steering means 98 is horizontally pivoted on one element 106 of a universal joint, another element 107 of which is mounted on the upper end of the base section 101. The universal joint may be enclosed in a housing 108 extending upwardly from the platform 2, and it is provided with an opening 109 through which the swinging post section 105 may extend. The swinging post section 105 may be connected by a pivoted lever 111 with the mechanism 99.

As set forth in the co-pending application of Joseph C. Lusse, Serial No. 122,634, filed July 15, 1926, the mechanism 99 comprises a strap member 112 which is centrally mounted on the underside 24 of the platform 2 and it is provided at one end with a recess adapted to receive the lower end of the pivoted lever 111. Thus the strap member 112 may be actuated longitudinally of the car upon a swinging movement of the post section 105.

A second strap member 113 is pivotally mounted on the strap member 112 at an intermediate point 114 and it is provided with oppositely extending arms respectively affording pivotal supports for corresponding ends of operating rods 115 and 116. These rods are connected by resilient devices 117 and 118 to the levers 62 and 97, respectively.

Each of the resilient devices 117 and 118 comprises a front abutment 119 and a rear adjustable abutment 121, which are respectively placed on opposite sides of one of the lever arms 62, 97. The ends of a spring 122 engage the abutment 121 and one of the levers 62, 97, causing the same to engage the front abutment 119, as shown in Fig. 1. The parts are so arranged that when the steering wheel 103 is in the normal mid-position and the swinging post section 105 is in the solid-line position shown in Fig. 1, the frictional driving elements 32 and 94 are disengaged from the car wheels 13 and 14, respectively.

When the post section 105, however, is actuated rearwardly into the dot-and-dash line position of Fig. 1, the strap member 112 is actuated forwardly, causing a corresponding movement of the pivoted strap member 113 against the force of springs 123 which respectively extend from the arms of said member 113 to the underside of the platform 2. The longitudinal movement thus imparted to the strap member 76 causes a similar movement of the rods 115 and 116 and a compression of the springs 122 until the force thereof is sufficient to cause a forward movement of the operating levers 62, 97 and the consequent engagement of the frictional driving elements 32 and 94 with the car wheels 13 and 14, respectively. The force of each of the springs 122 is such as to permit a predetermined movement of the frictional driving elements 32 and 94 independently of the actuating rods 115 and 116, so that during the operation just described, a space is formed between each of the front abutments 119 and its associated lever, as shown in Fig. 3. When the swinging post section 105 is released, it returns to the solid-line vertical position of Fig. 1 under the force of the springs 123 and the driving frictional elements 33 and 34 move into their original ineffective position.

The operation of the main driving motor 91 may be controlled in accordance with the movement of the swinging post section 105 by means of a switch 124 comprising a movable plug element 125 and spaced co-acting contact members 126 connected in the motor circuit. The movable contact element 125 is connected by a rod 127 and a frame 128 to the central strap member 112, the parts being so disposed that the plug element 125 is actuated into engagement with the contact members 126 to close the motor circuit just prior to the actuation of the frictional driving elements 32 and 94 into engagement with the car wheels 13 and 14. Thus the motor 91 is not required to start up under the load of the car and, moreover, the motor is energized only when the car is in motion, resulting in a material saving in power and a consequent decrease in operating expense. The switch 124 is described in greater detail in my co-pending application above-mentioned.

The turning of the car within a minimum radius may be effected by a lever 129, the forward end of which is pivotally secured to the vertical post section 101, a rearward end being provided with a slot 131 for the reception of a lug 132 extending downwardly from the bracket member 23. The length of the slot 131 is determined by the desired angular movement of the steering wheel 103. Intermediate the pivotal supporting points for the lever 129, a second slot 133 is provided for the reception of a bolt or lug 134 extending from a rear end portion of a third arm 135 of the pivoted strap member 113. The length of the slot 133 is also determined by the desired angular movement of the steering wheel 103.

When the steering wheel 103 is actuated from the mid-position of Fig. 3 to the angled position of Fig. 4, the operating rod 116 is actuated forwardly to compress further the spring 122 of the resilient device 118 while the rod 115 is actuated rearwardly to cause a similar movement of the operating arm 62. As a result, the sectional driving element 32 is disengaged from its co-operating car wheel 13 and the force of the frictional driving element 94 on the car wheel 14 is increased. The car now traverses a circular path, turning about the car wheel 13 as a pivot.

Figure 2:
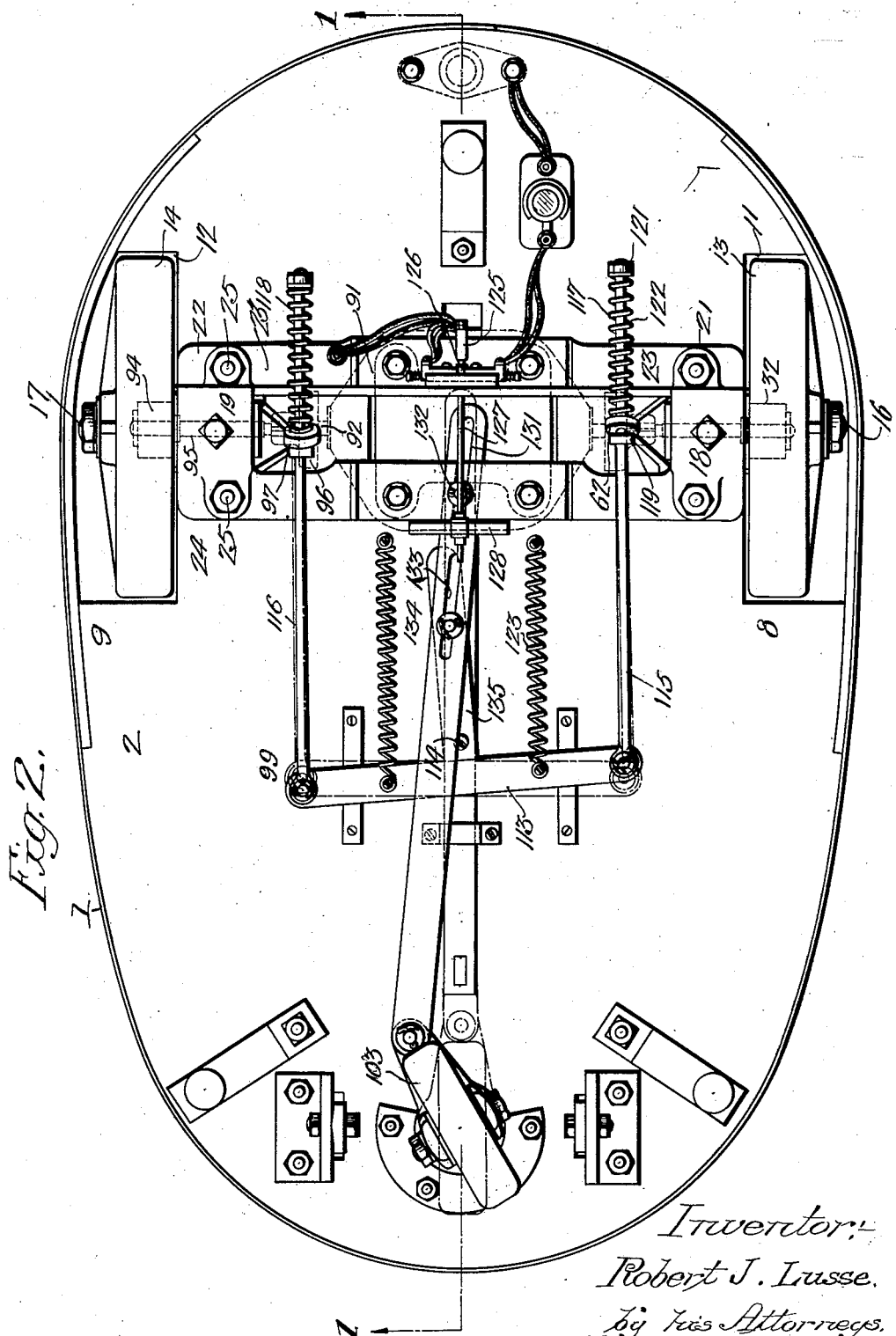
Fig. 2 is an inverted plan view of the underside of the car, illustrating the position of the control mechanism when the swinging post section is in the normal vertical position and the steering wheel is turned from the mid-position.

Should the swinging post section 105 be released from the position of Fig. 4, wherein the steering wheel 103 is moved from its mid-position, the several parts move into the position illustrated in Fig. 2, wherein both of the frictional driving elements 32 and 94 are disengaged from their cooperating car wheels 13 and 14.

While I have shown only one embodiment of my invention, for the purpose of describing the same and illustrating its principles of construction and operation, it is apparent that various changes and modifications may be made therein without departing from the spirit of my invention and I desire, therefore, that only such limitations shall be imposed thereon as are indicated in the appended claims or as are demanded by the prior art.

I claim:

1. In combination, a car wheel having a rim and a web, a car body having a movable bearing, a driving element for engagement with said rim and disposed adjacent to one side of said web, a shaft removably positioned in said bearing eccentrically of the axis thereof, one end of said shaft serving to support said driving element, a gear-wheel element detachably secured to the other end of the shaft, and actuating means for said movable bearing, whereby said driving element may be actuated relative to said rim, said web having an aperture through which said driving element and said shaft may be passed upon disengagement from said gear-wheel element.

2. A wheel having a rim and a web, a movable bearing, a driving element for engagement with said rim and disposed adjacent to one side of said web, a shaft removably positioned in said bearing eccentrically of the axis thereof, said shaft serving to support said driving element, a gear-wheel element threaded on said shaft, and actuating means for said movable bearing, said web having an aperture through which said driving element and said shaft may be passed upon disengagement from said gear-wheel element.

3. In combination, a car wheel having an aperture, a car body having a relatively movable bearing, a shaft journaled in said bearing, a driving element mounted on said shaft in operative relation to said car wheel and movable relative to said car wheel upon the actuation of said bearing, a driving motor, and gear-wheel mechanism for operatively associating said driving element and said motor for all positions of the former, said gear-wheel mechanism being detachable from said shaft to permit the removal thereof and said driving element through said aperture.

4. In combination, a wheel having a hub, a rim and an interconnecting web, said web having an aperture, a driving element for engagement with the inner side of said rim and disposed adjacent to one side of said hub, a car body having a movable bearing, a supporting shaft for said driving element eccentrically positioned in said bearing, a driving motor, gear-wheel mechanism for operatively associating said driving motor and said driving element for all positions of the latter, actuating means for said movable bearing, said gear-wheel mechanism being threaded to said shaft, permitting the removal of said driving element and said shaft through said aperture upon detachment therefrom.

5. A car body having a movable bearing, a car wheel having a hub, a rim and an interconnecting web, the latter being provided with an aperture, a driving element disposed on one side of said web movable relative to said rim, a driving shaft for said element removably positioned in said bearing eccentrically of the axis thereof, a driving motor, an internal gear-wheel threaded to said shaft, and a co-acting gear-wheel driven by said motor, said gear-wheels establishing a connection between said shaft and said driving motor for all positions of said driving element caused by a movement of said bearing, said internal gear-wheel being threaded on said shaft, whereby the latter and said driving element may be removed through said aperture only upon disengagement from said internal gear-wheel.

6. A bearing having a passage extending between opposite sides thereof, anti-friction means positioned in said passage, a shaft of enlarged diameter journaled in said anti-friction means and end portions of reduced diameter extending respectively beyond said opposite sides, a driving element mounted on one end portion, means abutting against said anti-friction means to limit the movement of said shaft in said passage in one direction, and gear-wheel mechanism constituting a locking element for said shaft detachably secured to the other end thereof, whereby the movement of said shaft in the opposite direction may be controlled by said mechanism.

7. A bearing having a passage extending between opposite sides thereof, anti-friction means for said passage positioned inwardly of said sides, a shaft having an intermediate portion of enlarged diameter supported by said anti-friction means, the respective end portions of said shaft being of reduced diameter and extending beyond said opposite sides, a member mounted on one of said end portions having a shoulder positioned to abut against said anti-friction means when said intermediate portion is in its desired position, a driving element having one side thereof abutting against said member, means for securing said driving element in said abutting position, and a coupling member constituting a locking element for said shaft mounted on the other end portion, said coupling member being operatively associated with said anti-friction means so as to prevent normally a movement of said shaft in a predetermined direction.

8. A movable bearing having a passage extending between the opposite sides thereof, anti-friction supporting means positioned inwardly of said sides comprising concentric rings and anti-friction elements, spacing means interposed between corresponding pairs of rings, a shaft having a portion of enlarged diameter supported by said rings and having end portions of reduced diameter extending respectively beyond said sides, a member rigidly secured to one of said end portions positioned in abutting relation to the ring of one of said anti-friction means so as to limit the movement of said shaft in one direction, said member having a flange, a plate spaced from said flange, a ring constituting a driving element positioned between said flange and said plate, and means for rigidly securing together said plate, flange and driving element.

9. A movable bearing having a passage extending between the opposite sides thereof, anti-friction supporting devices positioned inwardly of said sides comprising concentric rings and anti-friction elements, spacing means interposed between corresponding pairs of rings, a shaft having a portion of enlarged diameter supported by said rings and having end portions of reduced diameter extending respectively beyond said sides, a member rigidly secured to one of said end portions positioned in abutting relation to the ring of one of said anti-friction devices so as to limit the movement of said shaft in one direction, said member having a flange, a plate spaced from said flange, a ring constituting a driving element positioned between said flange and said plate, means for rigidly securing together said plate, flange and driving element, means for preventing the passage of grease from said last-mentioned anti-friction device to the adjacent side of said bearing, and a cap for securing said last-mentioned means in position having an annular plate section and also an inwardly extending flange in engagement with the wall of said passage.

10. A movable bearing having a passage extending between the opposite sides thereof, anti-friction supporting devices positioned inwardly of said sides comprising concentric rings and anti-friction elements, spacing means interposed between corresponding pairs of rings, a shaft having a portion of enlarged diameter supported by said rings and having end portions of reduced diameter extending respectively beyond said sides, a member rigidly secured to one of said end portions positioned in abutting relation to the ring of one of said anti-friction devices so as to limit the movement of said shaft in one direction, said member having a flange, a plate spaced from said flange, a ring constituting a driving element positioned between said flange and said plate, means for rigidly securing together said plate, flange and driving element, the said end of said shaft having a groove for the reception of a tool, the other end of said shaft being threaded, a locking nut mounted on said threaded end having releasable clamping means, and a spacing washer interposed between said nut and the other of said anti-friction devices.

11. A movable bearing having a passage extending between the opposite sides thereof, anti-friction supporting devices positioned inwardly of said sides comprising concentric rings and anti-frictional elements, spacing means interposed between corresponding pairs of rings, a shaft having a portion of enlarged diameter supported by said rings and having end portions of reduced diameter extending respectively beyond said sides, a member rigidly secured to one of said end portions positioned in abutting relation to the ring of one of said anti-friction devices so as to limit the movement of said shaft in one direction, said member having a flange, a plate spaced from said flange, a ring constituting a driving element positioned between said flange and said plate, means for rigidly securing together said plate, flange and driving element, the said end having a groove for the reception of a tool, means for preventing the passage of grease from said last-mentioned anti-friction device to the adjacent side of said bearing, a cap for securing said last-mentioned means in position having an annular plate section and also an inwardly extending flange in engagement with the wall of said passage, a gear element threaded to the other end of said shaft and provided with locking means, a washer interposed between said gear element and the other anti-friction device, and means tending to prevent the passage of lubricant from said last-mentioned anti-friction device to the adjacent side of said bearing.

ROBERT J. LUSSE.